(12) United States Patent
Musella et al.

(10) Patent No.: US 8,042,743 B2
(45) Date of Patent: Oct. 25, 2011

(54) IC CARD COMPRISING A MAIN DEVICE AND AN ADDITIONAL DEVICE

(75) Inventors: Enrico Musella, Pozzuoli (IT); Umberto Sorbo, Santa Maria Capua Vetere (IT)

(73) Assignee: Incard SA, Geneva (CH)

( * ) Notice: Subject to any disclaimer, the term of this patent is extended or adjusted under 35 U.S.C. 154(b) by 122 days.

(21) Appl. No.: 12/128,044

(22) Filed: May 28, 2008

(65) Prior Publication Data

US 2008/0302877 A1 Dec. 11, 2008

(30) Foreign Application Priority Data

May 28, 2007 (IT) .............................. MI2007A1085

(51) Int. Cl.
*G06K 19/06* (2006.01)

(52) U.S. Cl. ...... 235/492; 235/493; 340/10.1; 340/10.4; 340/10.41; 340/10.5

(58) Field of Classification Search .................. 235/492, 235/493; 340/10.1, 10.4, 10.41, 10.5
See application file for complete search history.

(56) References Cited

U.S. PATENT DOCUMENTS

| | | | | | |
|---|---|---|---|---|---|
| 5,929,414 | A * | 7/1999 | Saitoh | ........................... | 235/380 |
| 7,163,154 | B2 * | 1/2007 | Palmade | ........................ | 235/492 |
| 7,255,284 | B2 * | 8/2007 | Kim et al. | ..................... | 235/492 |
| 2003/0206547 | A1 * | 11/2003 | Cho | ................................. | 370/364 |
| 2005/0045720 | A1 * | 3/2005 | Fruhauf | ......................... | 235/440 |
| 2006/0208066 | A1 * | 9/2006 | Finn et al. | ..................... | 235/380 |
| 2007/0164118 | A1 * | 7/2007 | Degauque et al. | ............ | 235/492 |

FOREIGN PATENT DOCUMENTS

| | | |
|---|---|---|
| EP | 0424726 | 2/1991 |
| EP | 1313063 | 5/2003 |
| EP | 1605388 | 12/2005 |

* cited by examiner

*Primary Examiner* — Daniel Hess
*Assistant Examiner* — Michael Andler
(74) *Attorney, Agent, or Firm* — Lisa K. Jorgenson; Allen, Dyer, Doppelt, Milbrath & Gilchrist, P.A.

(57) ABSTRACT

The IC Card includes a main device having a microprocessor and a memory unit, and an I/O contact pad for a connection between the main device and a read write device, also referred to as a main interconnection. The IC card also includes additional device connectable to the main device via a secondary interconnection including the I/O contact pad, and a switch control for selectively switching between the main interconnection, for a transmission of data between the read write device and the main device, and the secondary interconnection, for a transmission of data between the main device and the additional device.

20 Claims, 3 Drawing Sheets

IC CARD COMPRISING A MAIN DEVICE AND AN ADDITIONAL DEVICE

FIELD OF THE INVENTION

The present invention relates to an integrated circuit (IC) Card including a microprocessor and a memory unit (generally referred to as the main device), and an input/output (I/O) contact pad for a connection between the main device and a read write device (also referred to as the main interconnection). The present invention also relates to a communication method for the above type IC Card.

BACKGROUND OF THE INVENTION

As it is well known, an IC Card includes a main device, including a processor and a memory portion, and a plurality of contact pads. The main device may be connected to a read-write device via a main interconnection including the contact pads. According to the ISO 7816-3 standard, the read-write device and the main device may communicate in a half duplex mode, sending and receiving data to and from the read-write device over an I/O contact pad of the main interconnection.

In particular, the IC Card is an electrically passive component; when it is connected to the read-write device it begins a power-up sequence, receiving a clock signal from the read write device and executing an operating system, for communicating with the read-write device. More particularly, the read-write device acts as a master device with respect to the IC Card, sending commands over the I/o contact pad, for example for executing an application or retrieving data stored inside the memory portion of the IC Card. The IC Card responds as a slave device, processing the commands and returning results to the read-write device over the I/O contact pad.

A disadvantage of such IC Card is that it may communicate only with the read write device, since it is powered by the read write device and, when powered, it may transmit data only over the I/O contact pad that is the unique channel available for communication. In other words, when the IC Card is powered, it is a slave device that can only establish a communication with the read write device, receiving command from the I/O contact pad and transmit data over the same I/O contact pad.

Moreover, the IC Card cannot establish a secondary communication with another device since it cannot use the I/O contact pad for the secondary communication, without damaging the ISO 7816 communication protocol with the read write device.

The problem at the basis of the present invention is that of providing an IC Card supporting a main interconnection between the read-write device and the main device, for exchanging main data over the I/O contact pad according to the ISO 7816-3 protocol, at the same time providing a secondary interconnection with an additional device, for transmitting secondary data, avoiding any modification to the main interconnection and to the ISO 7816-3 protocol, and overcoming the limitations of the current IC Card that narrow its use as a slave device with respect to the read-write device and prevent its communication with other additional devices.

SUMMARY OF THE INVENTION

The approach on which the present invention is based, is that of providing an IC Card comprising a main device intended to be connected to a read write device for transmission of data over the I/O contact pad and comprising an additional device intended to communicate with the main device over the I/O contact pad for a transmission of secondary data. More particularly, the approach is that of providing a switch control for selectively switching the I/O contact pad for a transmission of main data between the main device and the read write device or for a transmission of secondary data between the main device and the additional device, avoiding interruption of the transmission of main data and secondary data and safeguarding the ISO 7816-3 communication protocol between the read-write device and the main device.

Based thereon, the technical problem is solved by an IC Card comprising a microprocessor, a memory unit, generally indicated as the main device, and an I/O contact pad for a connection between the main device and a read write device, also indicated as main interconnection. The IC card further includes an additional device connectable to the main device via a secondary interconnection including the I/O contact pad, and a switch control for selectively switching on the main interconnection, for a transmission of data between the read write device and the main device, or switching on the secondary interconnection, for a transmission of data between the main device and the additional device.

Advantageously, the communication between the additional device and the main device does not affect the communication between the main device and the read-write device, based on the ISO 7816-3 communication protocol. Advantageously, the main device may communicate with the additional device, overcoming the disadvantage that limits its use as a slave device with respect to the read-write device. Advantageously, the additional device may be provided with an additional communication protocol for communicating with an external device, so that the main device may receive data not only directly from the read write device but also from the external device, through the additional device.

BRIEF DESCRIPTION OF THE DRAWINGS

Further characteristics and the advantages of the IC Card and the method of communication for such IC Card according to the present invention will be apparent from the following description of an embodiment thereof, made with reference to the annexed drawings, given for indicative and non-limiting purpose.

DETAILED DESCRIPTION OF THE PREFERRED EMBODIMENTS

Figure 1:
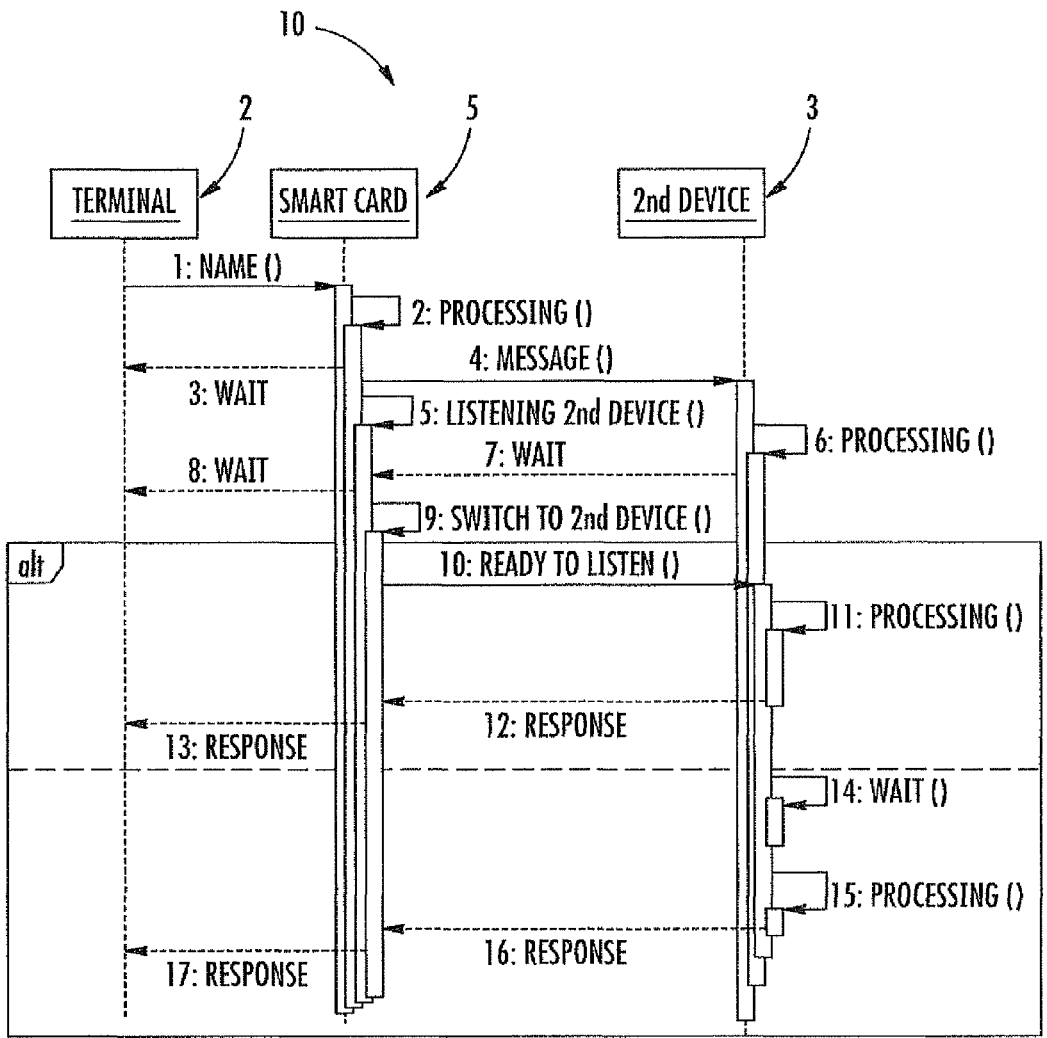
FIG. 1 is a schematic diagram illustrating a sequence of phases for the communication method according to the present invention.

With reference to the annexed drawings, an IC Card is schematically shown and globally indicated with numeral reference 1. The IC Card 1 comprises at least one memory unit, one processor and a plurality of contact pads for a connection with a read-write device 2. The processor and the memory unit of the IC Card 1 are for example integrated in a System on Chip 6 and they are hereinafter globally indicated as a main device 5 of the IC Card 1.

The connection between the read-write device 2 and the main device 5, hereinafter indicated as main interconnection, is established via an I/O contact pad of the contact pads. A transmission of data between the read-write device 2 and the main device 5, also indicated as transmission of main data, is executed over the I/O contact pad. More particularly, the transmission of main data is based on a master/slave communication wherein the read-write device 2 is the master and sends commands to the main device 5 while the main device 5 is the slave, processing the commands and returning results.

The read-write device 2 sends a command and waits for the main data from the main device 5 for a maximum waiting time, defined by the ISO 7816-3 protocol; if the main device 5 cannot return the main data within the maximum waiting time, it transmits a wait message to the read-write device 2. More particularly, when the main device 5 processes a command received by the read-write device 2, it cannot receive other commands from the read-write device 2.

According to the present invention, the IC Card 1 comprises an additional device 3 connectable to the main device 5 via a secondary interconnection including the I/O contact pad, and a switch control 9 for selectively switching between the main interconnection or the secondary interconnection. When the read-write device 2 is waiting for main data from the main device 5, data between the main device 5 and the additional device 3 may be transmitted on the secondary interconnection. In fact, while the read write device 2 is waiting for the result from the main device 5, the switch control 9 switches on the secondary interconnection since the I/O contact pad is free to be used.

For clarity, the transmission of data between the additional device 3 and the main device 5 is hereinafter indicated as transmission of secondary data. When the switch control 9 switches the I/O contact pad on the secondary interconnection, a transmission of secondary data may be executed while, when the switch control 9 switches the I/O contact pad on the main interconnection, a transmission of main data may be executed.

According to the present invention, the additional device 3 comprises its own processor and memory unit and is embedded inside the IC Card 1. The processor and the memory unit of the additional device 3 may be included in the same System on Chip 6 of the main device 5, as schematically represented in FIG. 2b, or they may be provided in a separate System on Chip 7, as schematically represented in FIGS. 2a, 2c-2d.

Figure 2A:
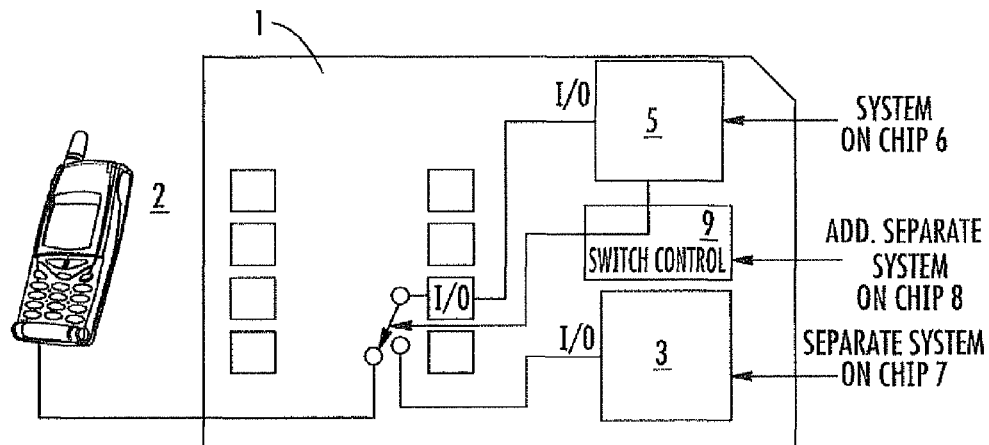
FIG. 2a is a schematic diagram illustrating an IC Card according to the present invention.
Figure 2B:
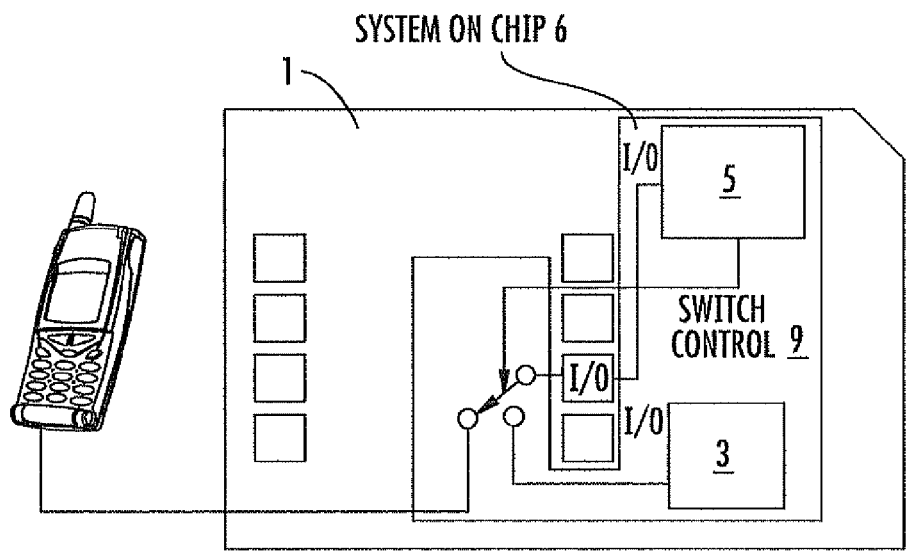
FIG. 2b is a schematic diagram illustrating a different embodiment of an IC Card, according to the present invention.
Figure 2C:
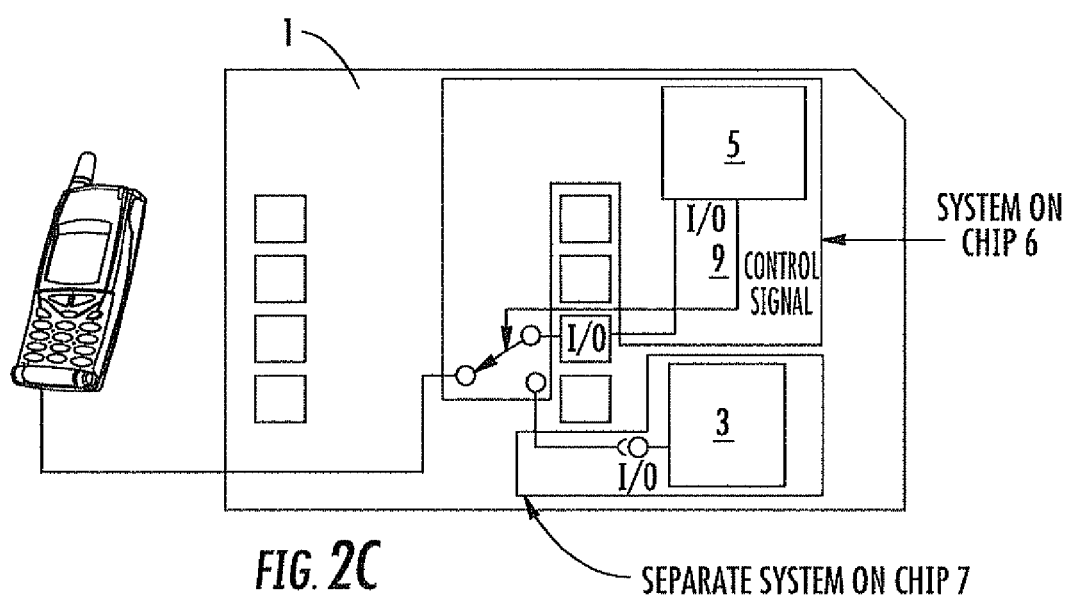
FIG. 2c is a schematic diagram illustrating another embodiment of an IC Card, according to the present invention.
Figure 2D:
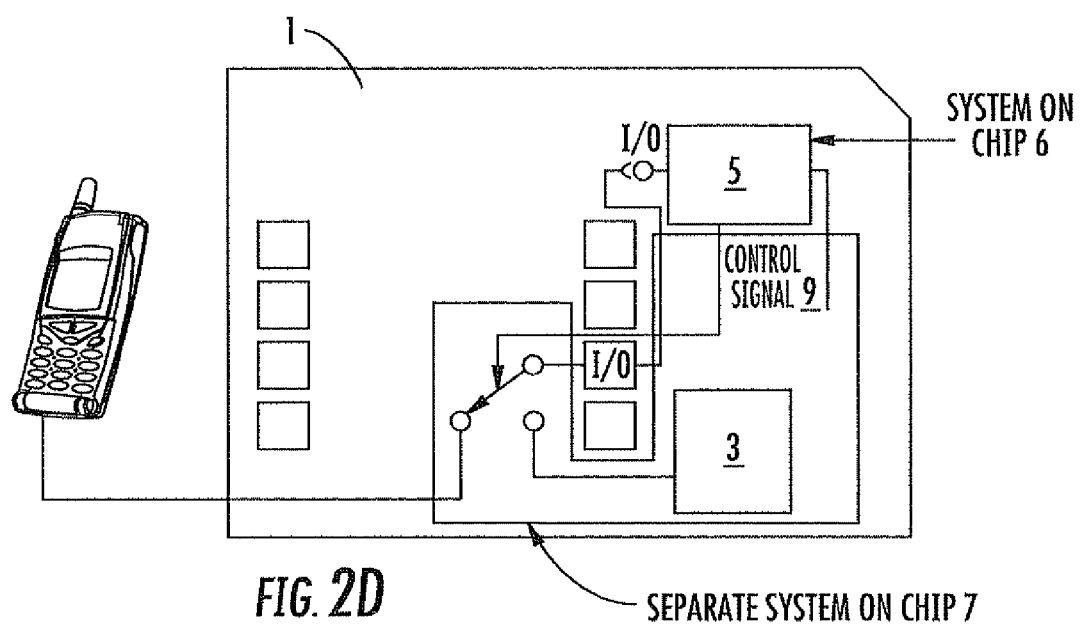
FIG. 2d is a schematic diagram illustrating a further embodiment of an IC Card, according to the present invention.

Also the switch control 9 may be included in the same System on Chip 6 of the main device 5, as schematically represented in FIGS. 2b-2c or it may be included in the separate System on Chip 77 as schematically represented in FIG. 2d, or it may be included in an additional separate System on Chip 8, as schematically represented in FIG. 2a. The switch control 9 switches the I/O contact pad on the secondary interconnection, while the read-write device 2 waits for main data from the main device 5, so that a transmission of secondary data may be executed, for example for retrieving data from the memory unit of the additional device 3.

More particularly, the communication method according to the present invention establishes a master/slave communication between the main device 5 and the additional device 3, wherein the main device 5 is the master and sends commands to the additional device 3 while the additional device 3 is the slave, processing the commands and returning results to the main device 5. Without limiting the scope of protection of the invention, the communication between the main device 5 and the additional device 3 may be based on the ISO 7816-3 protocol.

The additional device 3 may additionally support one or more additional communication protocols, for a communication with an external device. For example a wireless communication protocol, more particularly a ZigBee communication protocol, for transmitting/receiving data respectively to/from a wireless server.

The communication method according to the invention prevents that the main device 5 re-establishes a communication with the read-write device 2 in an unpredictable way, avoiding that a connection between the additional device 3 and the main device 5 is suspended while the additional device 3 returns secondary data to the main device 5. In fact a communication between the main device 5 and the read-write device 2 would require the use of the I/O contact pad, determining an interruption of the communication between the additional device 3 and the main device 5 and an interruption of the transmission of secondary data from the additional device 3 to the main device 5.

The switch control 9 maintains the I/O contact pad switched on the secondary interconnection so that the additional device 3 may transmit the secondary data to the main device 5, when they are ready to be sent. Since the main device 5 must send a waiting message to the read-write device 2 when the maximum waiting time is spent, the additional device 3 provides to generate and send such waiting message to the main device 5. In other words, if the additional device 3 is not able to process and return a response to the main device 5 within the maximum waiting time, it sends a wait message to the main device 5.

In such case, the switch control 9 switches the I/O contact pad towards the main interconnection and temporary switches off the secondary interconnection so that the IC Card 1 forwards the waiting message to read-write device 2. Then, the switch control 9 switches on again the secondary interconnection, in order to let the main device 5 receive the secondary data from the additional device 3.

The communication method manages all the possible conflicts that may occur due to the switches between the main interconnection and the secondary interconnection and vice versa. For example, a conflict may occur if the time required by the additional device 3 for returning the secondary data is higher than the maximum waiting time but not so high to execute the following steps:

switch on the main interconnection;
forward the waiting message from the main device 5 to the read-write device 2; and
switch on the secondary interconnection for receiving secondary data.

For example:
the maximum waiting time is X and
the time required by the additional device 3 for returning secondary data is X+ξ, where ξ<<X and
ξ is not enough to switch on the main interconnection, to forward the waiting message from the main device 5 to the read-write device 2 and to switch on again the secondary interconnection to receive the secondary data.

In this case the additional device 3 cannot return the secondary data immediately after their processing because, in that precise moment, the secondary interconnection could be switched off. To prevent such a possible conflict, the communication method provides that the additional device 3 waits for a guard time before returning the secondary data to the main device 5, allowing the switch control 9 to switch on again the secondary connection.

More particularly, the switch control 9, after the main device 5 has forwarded the waiting message to the read-write device 2, switches on the secondary connection in a ready to listen state, waiting for secondary data from the additional device 3. When the additional device 3 has processed the secondary data, it returns them to the main device 5, over the secondary connection. The switch control 9, after the main device 5 has received the secondary data over the secondary interconnection, may switch on the main interconnection. Secondary data may be processed by the main device 5 and transmitted over the main interconnection to the read write device 2, so that they are used as main data.

Hereinafter a description of the main phases according to the communication method of the present invention will be described. The communication method is provided for an IC Card 1 comprising a microprocessor, a memory unit, globally indicated as main device 5, and an I/O contact pad for a connection between the main device 5 and a read write device 2, also indicated as main interconnection. The IC Card 1 also comprises an additional device 3 connectable to the main device 5 via a secondary interconnection including the I/O contact pad.

According to the method, the switch control 9 selectively switches on the main interconnection, for a transmission of data between the read write device 2 and the main device 5, or switches on the secondary interconnection, for a transmission of data between the main device 5 and the additional device 3. When the IC Card is connected to the read write device and activated the switch control 9 switches on the main interconnection.

The transmission of data on the main interconnection, also indicated as transmission of main data, is based on a ISO 7816-3 protocol wherein the read write device 2 sends commands to the main device 5 and waits for results. The switch control 9 switches on the secondary interconnection when the read write device 2 is waiting the main data from the main device 5. The communication between the main device 5 and the additional device 3 is a master slave communication wherein the main device 5 is the master, sending commands to the additional device 3, while the additional device 3 is the slave, returning results to the main device 5.

When a timeout has elapsed and the additional device 3 is not ready to send the result to the main device 3, the additional device 3 returns a waiting message to the main device 5. More particularly, after the main device 3 has received the waiting message from the additional device 3, at least the following consecutive phases are executed:

the switch control 9 switches on the main interconnection;
the main device 3 forwards the waiting message to the read-write device 2;
the switch control 9 switches on again the secondary interconnection, after that said waiting message has been received by the read write device 2;

The additional device 3 returns the result over the secondary interconnection when the result is ready. More particularly, a guard time is introduced before sending the result over the secondary interconnection. The guard time is at least equal to the execution time of the consecutive phases. The additional device 3 is connectable to an external device via a wireless communication protocol; the wireless communication protocol may be a ZigBee protocol.

Advantageously, according to the IC Card and to the method of the present invention, the main device may communicate with additional devices even if the IC Card is an electrically passive component, powered by a read write device, and the unique channel available for communication is the I/O contact pad used for the communication with such read write device.

The IC Card and the method of the invention overcome the disadvantage that limits its use in a master/slave communication wherein the IC Card is the slave device. Advantageously, the communication method does not require any modification to the ISO 7816-3 protocol that is at the base of a communication between the IC Card and the read-write device.

Advantageously, the additional device may be provided with an additional communication protocol for communicating with an external device, so that the main device may receive data not only directly from the read write device but also from the external device, through the additional device.

The which is claimed is:

1. An integrated circuit (IC) Card for use with a read/write device, the IC card comprising:
    a first processing device;
    a first interconnection defined between the first processing device and the read/write device and including an input/output (I/O) contact pad;
    a second processing device connectable to the first processing device to communicate with the first processing device via the I/O contact pad;
    a second interconnection defined between the second processing device and the first processing device; and
    a switch control to selectively switch between the first interconnection for a transmission of data between the read/write device and the first processing device, and the second interconnection for a transmission of data between the first processing device and the second processing device;
    communication between the first processing device and the second processing device defining a master slave communication, the first processing device being the master and sending commands to the second processing device, and the second processing device being the slave and returning results to the first processing device.

2. The IC Card according to claim 1 wherein the first processing device, the switch control and the second processing device are integrated in a first System on Chip.

3. The IC Card according to claim 1 wherein the first processing device and the switch control are integrated in a System on Chip and the second processing device is integrated in a separate second System on Chip.

4. The IC Card according to claim 1 wherein the first processing device is integrated in a first System on Chip, and the switch control and the second processing device are integrated in a separate second System on Chip.

5. The IC Card according to claim 1 wherein the first processing device is integrated in a System on Chip, the second processing device is integrated in a separate second System on Chip, and the switch control is integrated in a third separate System on Chip.

6. A communication method for an IC Card including a first processing device, and a first interconnection for a connection between the first processing device and a read/write device and including an I/O contact pad, and a second processing device connectable to the first processing device to communicate with the first processing device via the I/O contact pad and defining a second interconnection therebetween, the method comprising:
    providing a switch control for selectively switching between the first interconnection for a transmission of data between the read/write device and the first processing device, and the second interconnection for a transmission of data between the first processing device and the second processing device;

communication between the first processing device and the second processing device defining a master slave communication, the first processing device being the master and sending commands to the second processing device, and the second processing device being the slave and returning results to the first processing device.

7. The communication method according to claim 6 wherein the switch control switches on the first interconnection when the IC Card is powered on.

8. The communication method according to claim 6 wherein the transmission of data on the first interconnection is based on an ISO 7816-3 protocol wherein the read/write device sends a command to the first processing device and waits for a result.

9. The communication method according to claim 8 wherein the switch control switches on the second interconnection when the read/write device is waiting for data from the first processing device.

10. The communication method according to claim 6 wherein the second processing device returns a waiting message to the first processing device when a timeout has elapsed and a result is not ready to be sent to the first processing device.

11. The communication method according to claim 10 further comprising executing at least the following sequential phases when the timeout has elapsed:
   after the first processing device has received the waiting message, the switch control switches on the first interconnection;
   the first processing device forwards the waiting message to the read-write device; and
   after the waiting message has been received by the read/write device, the switch control switches on the second interconnection.

12. The communication method according to claim 11 wherein the second processing device returns the result over the second interconnection.

13. The communication method according to claim 12 wherein a guard time is introduced before sending the result over the second interconnection.

14. The communication method according to claim 13 wherein the guard time is at least equal to an execution time of the sequential phases.

15. The communication method according to claim 14 wherein the second processing device is connectable to an external device via a wireless communication protocol.

16. The communication method according to claim 15 wherein the wireless communication protocol is a ZigBee protocol.

17. A communication method for an IC Card for use with a read/write device, the method comprising:
   providing the IC card with a first processing device;
   connecting the first processing device and the read/write device with a first interconnection including an IC card I/O contact pad;
   providing a second processing device connectable to the first processing device to communicate with the first processing device via the I/O contact pad and defining a second interconnection therebetween; and
   selectively switching between the first interconnection for a transmission of data between the read/write device and the first processing device, and the second interconnection for a transmission of data between the first processing device and the second processing device;
   communication between the first processing device and the second processing device defining a master slave communication, the first processing device being the master and sending commands to the second processing device, and the second processing device being the slave and returning results to the first processing device.

18. The communication method according to claim 17 wherein the first interconnection is switched on when the IC Card is powered on.

19. The communication method according to claim 17 wherein the transmission of data on the first interconnection is based on an ISO 7816-3 protocol wherein the read/write device sends a command to the first processing device and waits for a result.

20. The communication method according to claim 19 wherein the second interconnection is switched on when the read/write device is waiting for data from the first processing device.

* * * * *